SILAS R. DIVINE, OF NEW YORK, N. Y.

Letters Patent No. 86,142, dated January 26, 1869.

IMPROVEMENT IN THE MANUFACTURE OF CARBONATE OF AMMONIA.

The Schedule referred to in these Letters Patent and making part of the same.

*To all whom it may concern:*

Be it known that I, SILAS R. DIVINE, of the city, county, and State of New York, have invented a new and improved Process for the Manufacture of Carbonate of Ammonia; and I do hereby declare that the following is a full and exact description thereof.

The nature of my invention consists in using, in the manufacture of carbonate of ammonia, the waste carbonate of lime from soap-manufactories, paper-mills, woollen, cotton, and linen-mills, bleacheries, chemical works, and all establishments that make caustic lye from carbonated alkalies.

To enable others skilled in the art to use my invention, I will proceed to describe the method employed.

The waste carbonate of lime, aforesaid, is thoroughly dried, and mixed, in proper proportions, with a salt of ammonia, such as the sulphate or muriate, and exposed to heat in a retort, in a similar manner to the well-known process of using ground chalk with an ammoniacal salt. By this means carbonate of ammonia is formed and sublimed, and may be collected in a suitable chamber or receiver.

What I claim as my invention, and desire to secure by Letters Patent, is—

The use of artificial carbonate of lime, for the manufacture of carbonate of ammonia, substantially as herein described.

SILAS R. DIVINE.

Witnesses:
JOHN W. MORGAN,
HENRY M. BREWSTER.